United States Patent
Matland

(10) Patent No.: US 10,707,577 B1
(45) Date of Patent: Jul. 7, 2020

(54) ELECTRONICALLY SCANNED ARRAY LEAKY WAVE PHASE SHIFT NETWORK

(71) Applicant: Rockwell Collins, Inc., Cedar Rapids, IA (US)

(72) Inventor: Aimee M. Matland, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/547,382

(22) Filed: Aug. 21, 2019

(51) Int. Cl.
- *H01Q 3/36* (2006.01)
- *G01S 13/534* (2006.01)
- *H04B 7/0456* (2017.01)
- *H04B 7/0426* (2017.01)

(52) U.S. Cl.
CPC ............ *H01Q 3/36* (2013.01); *G01S 13/534* (2013.01); *H04B 7/043* (2013.01); *H04B 7/0469* (2013.01)

(58) Field of Classification Search
CPC ........ H01Q 3/36; H04B 7/043; H04B 7/0469; G01S 13/534
See application file for complete search history.

(56) References Cited

U.S. PATENT DOCUMENTS

| 2017/0041038 A1* | 2/2017 | Kirkpatrick | G01S 13/02 |
| 2018/0166795 A1* | 6/2018 | Pruett | H01Q 5/30 |
| 2020/0014443 A1* | 1/2020 | Kuwabara | H01Q 3/38 |

* cited by examiner

Primary Examiner — Vineeta S Panwalkar
(74) Attorney, Agent, or Firm — Suiter Swantz pc llo

(57) ABSTRACT

A communication system is disclosed. In embodiments, the communication system includes an electronically scanned array (ESA) including a plurality of antenna terminal elements, the ESA configured to transmit an output beam. In embodiments, the communication system may further include a phase shift network. The phase shift network may include: a first set of one or more tunable local oscillators; a first antenna array configured to generate a first intermediate phase shift signal; and a second antenna array configured to generate a second intermediate phase shift signal. In embodiments, the phase shift network further includes a first plurality of mixers configured to combine an intermediate transmit signal and at least one of the first intermediate phase shift signal or the second intermediate phase shift signal to generate ESA input signals, wherein the ESA is configured generate the output beam in response to the ESA input signals.

15 Claims, 11 Drawing Sheets

FIG. 7B

ELECTRONICALLY SCANNED ARRAY LEAKY WAVE PHASE SHIFT NETWORK

BACKGROUND

Aircraft antennas including active electronically scanned arrays (AESAs) often utilize semiconductor and integrated circuit devices to carry out various functions, including receipt and transmission of radio frequency (RF) signals, control loops, phase shifting functions, and the like. As the operating frequency of AESAs increases, the size of each antenna terminal element must decrease, while the number of components required for each antenna terminal element must remain the same. In particular, conventional AESAs require a phase shifter for each antenna terminal element. Accordingly, as the operating frequency of AESAs increase, the same number of components must be required to be fit within a smaller area within the AESA. Furthermore, the size and power budget for each antenna terminal element within the AESA decreases with increasing operating frequency. Taken together, these practical limitations of conventional AESAs result in complex, expensive fabrication as well as limitations in the size and scalability of AESAs which operate at ever-increasing operating frequencies. Therefore, there exists a need in the art for a system and method which cure one or more of the shortfalls of previous approaches identified above.

SUMMARY

A communication system is disclosed. In embodiments, the communication system includes an electronically scanned array (ESA) including a plurality of antenna terminal elements, the electronically scanned array configured to transmit an output beam. The communication system may further include a phase shift network configured to steer the output beam. In embodiments, the phase shift network includes a first set of one or more tunable local oscillators. In embodiments, the phase shift network further includes a first antenna array configured to receive a tuning signal from the first set of one or more tunable local oscillators to generate a first intermediate phase shift signal, and a second antenna array configured to receive a signal from the first set of one or more tunable local oscillators to generate a second intermediate phase shift signal. In embodiments, the phase shift network further includes a first plurality of mixers configured to combine an intermediate transmit signal and at least one of the first intermediate phase shift signal or the second intermediate phase shift signal to generate ESA input signals, wherein the ESA is configured generate the output beam in response to the ESA input signals. In embodiments, the first intermediate phase shift signal induces a phase shift of the ESA input signals in a first direction, and the second intermediate phase shift signal induces a phase shift of the ESA input signals in a second direction different from the first direction.

A communication system is disclosed. In embodiments, the communication system includes an electronically scanned array (ESA) including a plurality of antenna terminal elements, the electronically scanned array configured to receive an input beam and generate ESA output signals in response to the received input beam. In embodiments, the system may further include a phase shift network, the phase shift network including a first set of one or more tunable local oscillators. In embodiments, the phase shift network further includes a first antenna array configured to receive a tuning signal from the first set of one or more tunable local oscillators to generate a first intermediate phase shift signal, and a second antenna array configured to receive a signal from the first set of one or more tunable local oscillators to generate a second intermediate phase shift signal. In embodiments, the phase shift network further includes a first plurality of mixers configured to combine the ESA output signals and at least one of the first intermediate phase shift signal or the second intermediate phase shift signal to generate an intermediate receive signal. In embodiments, the first intermediate phase shift signal induces a phase shift of the ESA output signals in a first direction, and the second intermediate phase shift signal induces a phase shift of the ESA output signals in a second direction different from the first direction.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 7B illustrates a required applied phase shifts of 5 GHz antenna arrays to generate a beam pointed phase distribution of a 20 GHz electronically scanned array, in accordance with one or more embodiments of the present disclosure.

DETAILED DESCRIPTION

Figure 1:
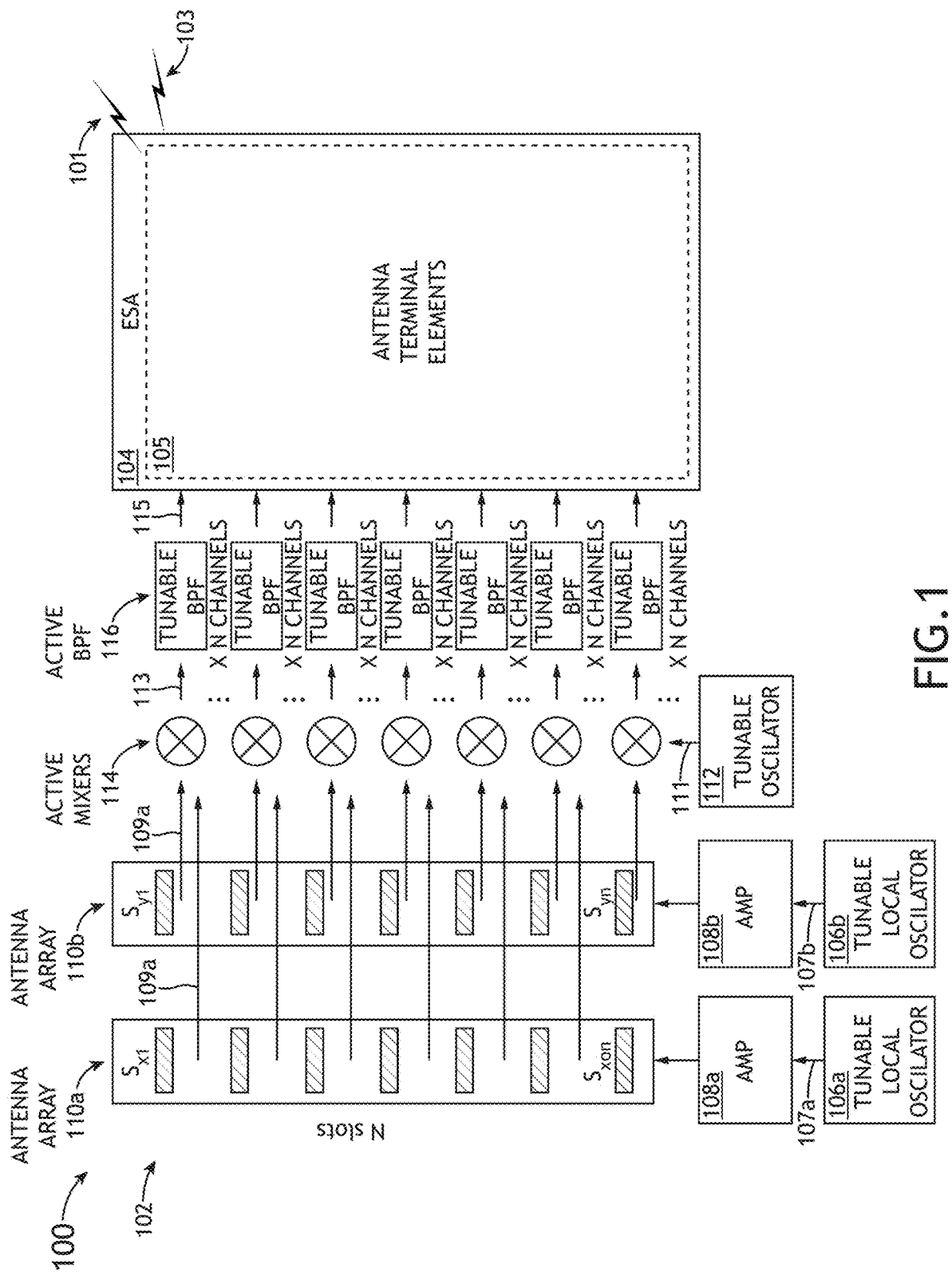
FIG. 1 illustrates a communication system including a phase shift network, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

As the operating frequency of AESAs increases, the size of each antenna terminal element must decrease, while the number of components required for each antenna terminal element must remain the same. In particular, conventional AESAs require a phase shifter for each antenna terminal element. Accordingly, as the operating frequency of AESAs increase, the same number of components must be required to be fit within a smaller area within the AESA. Furthermore, the size and power budget for each antenna terminal element within the AESA decreases with increasing operating frequency. Taken together, these practical limitations of conventional AESAs result in complex, expensive fabrication as well as limitations in the size and scalability of AESAs which operate at ever-increasing operating frequencies.

Accordingly, embodiments of the present disclosure are directed to a system and method which cure one or more of the shortfalls of previous approaches identified above. Embodiments of the present disclosure are directed to a communication system which utilizes antenna arrays in order to generate phase shifts and steer beams of an electronically scanned array (ESA). In particular, the communication system of the present disclosure may utilize a phase shift network including mixers and leaky wave antenna arrays in order to achieve per-element phase shifts of antenna terminal elements within an ESA. Additional embodiments of the present disclosure are directed to a communication system which utilizes arrays of antennas (e.g., leaky wave antenna arrays) operating at one frequency to generate phase shifts and steer beams of a different array (e.g., ESA) operating at a different frequency.

It is contemplated herein that the use of phase shift networks including mixers and antenna arrays (e.g., leaky wave antenna arrays) to generate phase shifts may enable the elimination of individual phase shifters required in conventional AESAs behind each individual antenna terminal element. Control elements (e.g., Field Programmable Gate Arrays (FPGAs)), associated power elements, and phase shifter power supply elements may also be eliminated. These design simplifications may reduce the required size/space of AESAs, and enhance AESA scalability. Additionally, it is contemplated herein that embodiments of the present disclosure may reduce and/or eliminate phase shift quantization errors and phase discretization present in conventional AESAs. Furthermore, the use of leaky wave antenna arrays along with band pass filters and mixers may provide for AESAs with a larger bandwidth potential which is adaptable for a wide variety of systems and signals.

FIG. 1 illustrates a communication system 100 including a phase shift network 102, in accordance with one or more embodiments of the present disclosure. The communication system 100 may include, but is not limited to, a phase shift network 102 and an electronically scanned array (ESA 104) including a plurality of antenna terminal elements 105. In embodiments, the phase shift network 102 illustrated in FIG. 1 may be configured to generate phase shifts/phase distributions in order to point/steer output beam 101 and/or input beam 103 of the ESA 104 in a single direction (e.g., X direction or Y direction).

In embodiments, the ESA 104 includes a plurality of antenna terminal elements 105 configured to transmit an output beam 101 and/or receive an input beam 103 to/from one or more additional communication devices (e.g., satellites, other aircraft, and the like). For example, the ESA 104 may include an active electrically scanned array (AESA) of an aircraft antenna configured to carry out one or more aircraft communications functions.

In embodiments, the communication system 100 further includes a phase shift network 102 communicatively coupled to the ESA 104/antenna terminal elements 105. The phase shift network 102 may include, but is not limited to, one or more tunable local oscillators (tunable LO 106a, 106b, 112), one or more amplifiers 108a, 108b, a first antenna array 110a, a second antenna array 110b, one or more active mixers 114, and one or more band pass filters 116. As noted previously herein, the phase shift network 102 of the present disclosure may be configured to generate phase shifts and steer beams (e.g., output beam 101, input beam 103) for the antenna terminal elements 105 of the ESA 104. In this regard, the phase shift network 102 may be utilized to replace the phase shifters which are currently required behind each antenna terminal element of conventional AESAs and other communication systems.

In embodiments, the phase shift network 102 may include one or more tunable local oscillators (tunable LO 106a, 106b) communicatively coupled to one or more antenna arrays 110a, 110b. For example, as shown in FIG. 1, the phase shift network 102 may include a first tunable LO 106a communicatively coupled to a first amplifier 108a and a first antenna array 110a. By way of another example, the phase shift network 102 may include a second tunable LO 106b communicatively coupled to a second amplifier 108b and a second antenna array 110b.

It is contemplated herein that the first antenna array 110a and the second antenna array 110b may include any M×N array, N×N array, or other arrangement of antenna elements known in the art. Similarly, the antenna arrays 110a may include any antenna arrays known in the art. For example, the antenna arrays 110a, 110b and the second antenna array 110b may include, but are not limited to, leaky wave antenna arrays 110a, 110b. For instance, the leaky wave antenna arrays 110a, 110b may include slotted leaky wave antenna arrays 110a, 110b, patch-antenna leaky wave antenna arrays 110a, 110b, and the like. While the antenna arrays 110a, 110b are primarily shown and described in the context of leaky wave antennas, this is not to be regarded as a limitation of the present disclosure, unless noted otherwise herein. In this regard, it is contemplated herein that a wide variety of antenna arrays may be utilized in the context of the phase shift network 102.

As noted previously herein, the phase shift network 102 may be configured to generate phase shifts/phase distributions in order to steer beams of the ESA 104 in a single direction. For the purposes of simplicity, it may be said that the phase shift network 102 may be configured to steer beams of the ESA 104 in either the "X direction" or the "Y direction." For the purposes of the present disclosure, the X direction and the Y direction may be regarded as being orthogonal to one another. However, it may be appreciated herein that reference to an X direction or Y direction may be arbitrary and are for purposes of simplicity. By way of example, the first antenna array 110a may be configured to generate phase shifts and steer beams of the plurality of antenna terminal elements 105 of the ESA 104 in an X direction. By way of another example, the second antenna array 110b may be configured to generate phase shifts and steer beams of the plurality of antenna terminal elements 105 of the ESA 104 in a Y direction. In this regard, the phase shift network 102 illustrated in FIG. 1 may be configured to generate phase shifts in either the X direction or the Y direction.

In embodiments, the tunable LO 106a, 106b may be configured to generate a tuning signal 107a, 107b (e.g., analog signal) and transmit the tuning signal 107a, 107b to the amplifiers 108a, 108b. It is noted herein that the one or more tunable LO 106a, 106b, 112 of the communication system 100 may include any tunable local oscillators known in the art including, but not limited to, variable frequency synthesizers, and the like. The amplifiers 108a, 108b may then be configured to transmit amplified signals to the first antenna array 110a or the second antenna array 110b, respectively. In embodiments, the first antenna array 110a and the second antenna array 110b are configured to generate intermediate phase shift signals 109a, 109b in response to the tuning signals 107a, 107b received from the respective tunable LO 106a, 106b. Intermediate phase shift signals 109a, 109b may be transmitted from the respective antenna array 110a, 110b to one or more active mixers 114.

In embodiments, the one or more active mixers 114 are configured to combine an intermediate phase shift signal 109a, 109b with a tuning signal 111 generated by a tunable LO 112. In embodiments, the mixer output 113 may be configured to steer a beam of the ESA 104 in either the X direction or the Y direction. In this regard, the mixer output 113 of the one or more active mixers 114 may be directed through one or more active band pass filters (BPFs) 116 and to the plurality of antenna terminal elements 105 of the ESA 104 as phase shift network output signals 115 (PSN output signals 115). In embodiments, PSN output signals 115 provided to the ESA 104 may be configured to change the per-element phase shift of each respective antenna terminal element 105 in order to steer a beam of the ESA 104.

For example, a controller may be configured to cause the tunable LO 106a to generate a tuning signal 107a with a selected frequency. Upon receiving the tuning signal 107a from the tunable LO 106a, the first antenna array 110a (e.g., first leaky wave antenna array 110a) may generate an intermediate phase shift signal 109a and transmit the intermediate phase shift signal 109a to the one or more active mixers 114. Similarly, a controller may be configured to cause the tunable LO 112 to generate a tuning signal 111 with a selected frequency and transmit the tuning signal 111 to the one or more active mixers 114. The one or more active mixers 114 may then be configured to combine the intermediate phase shift signal 109a with the tuning signal 111 from the tunable LO 112. The mixer output 113 from the one or more local mixers 114 may then be passed through one or more active band pass filters 116 to the ESA 104 as a PSN output signal 115 which is configured to induce a phase shift/phase distribution in order to steer a beam (e.g., output beam 101, input beam 103) of the ESA 104 in the X direction.

By way of another example, a controller may be configured to cause the tunable LO 106b to generate a tuning signal 107b with a selected frequency. Upon receiving the tuning signal 107b from the tunable LO 106b, the second antenna array 110b (e.g., second leaky wave antenna array 110b) may generate an intermediate phase shift signal 109b and transmit the intermediate phase shift signal 109b to the one or more active mixers 114. Similarly, a controller may be configured to cause the tunable LO 112 to generate a tuning signal 111 with a selected frequency and transmit the tuning signal 111 to the one or more active mixers 114. The one or more active mixers 114 may then be configured to combine the intermediate phase shift signal 109b with the tuning signal 111 from the tunable LO 112. The mixer output 113 from the one or more local mixers 114 may then be passed through one or more active band pass filters 116 to the ESA 104 as a PSN output signal 115 which is configured to induce a phase shift/phase distribution in order to steer a beam (e.g., output beam 101, input beam 103) of the ESA 104 in the Y direction.

The phase shift network 102 illustrated in FIG. 1 may be further shown and described with reference to FIG. 2.

Figure 2:
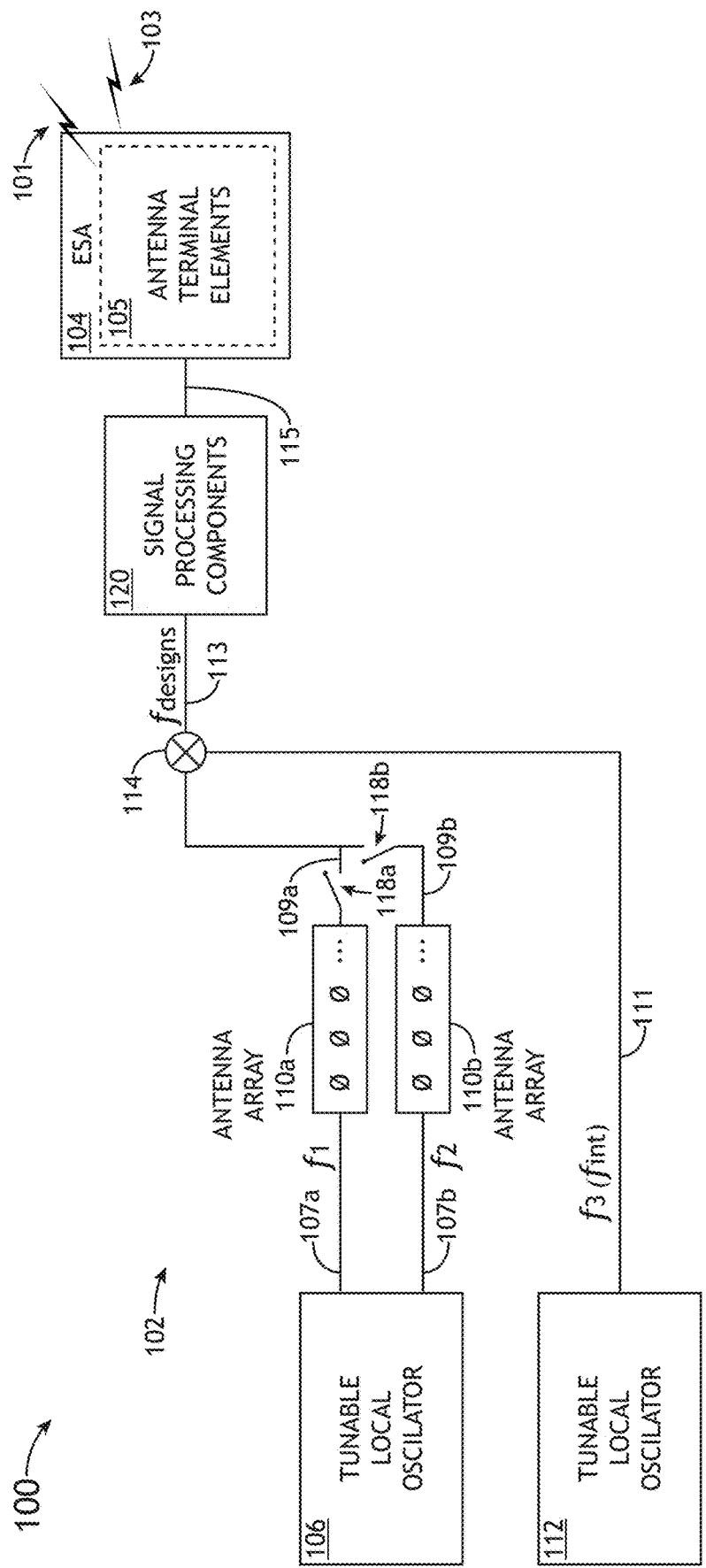
FIG. 2 illustrates a communication system including a phase shift network, in accordance with one or more embodiments of the present disclosure.

FIG. 2 illustrates a communication system 100 including a phase shift network 102, in accordance with one or more embodiments of the present disclosure. More particularly, FIG. 2 illustrates an additional and/or alternative conceptual view of the phase shift network 102 depicted in FIG. 1 which is configured to generate phase shifts in order to steer a beam of the ESA 104 in either the X direction or the Y direction. As the terms are used herein, boresight may be regarded as an axis normal to a surface of the ESA 104, and "X direction" and "Y direction" may be axes normal to each other and normal to boresight which are both within a plane parallel to the ESA 104. In this regard, beam steering in the X direction and Y direction may be regarded as "horizontal" and "vertical" beam steering. This will be described in further detail herein associated with FIG. 5C.

As shown in FIG. 2, the phase shift network 102 may include a single tunable LO 106 configured to provide tuning signals (e.g., tuning signal 107*a*, tuning signal 107*b*) to either the first antenna array 110*a* or the second antenna array 110*b*. In this regard, a controller and/or the tunable LO 106 may be configured to control whether the phase shift network 102 steers a beam of the ESA 104 in the X direction or in the Y direction relative to boresight. For example, by providing a tuning signal 107*a* to the first array of antennas 110*a*, the phase shift network 102 may be configured to generate a PSN output signal 115 which is configured to induce a phase shift which steers a beam of the ESA 104 in the X direction. By way of another example, by providing a tuning signal 107*b* to the second array of antennas 110*b*, the phase shift network 102 may be configured to generate a PSN output signal 115 which is configured to induce a phase shift which steers a beam of the ESA 104 in the Y direction.

In an additional and/or alternative embodiment, the phase shift network 102 may include one or more switches 118*a*, 118*b* configured to control one or more characteristics of the PSN output signal 115. For example, the phase shift network 102 may include a first switch 118*a* communicatively coupled to the first antenna array 110*a* and a second switch 118*b* communicatively coupled to the second antenna array 110*b*. In embodiments, switch 118*a*, 118*b* may be configured to connect and/or disconnect the respective antenna arrays 110*a*, 110*b*. In this regard, switch 118*a*, 118*b* may be selectively actuated in order to generate a PSN output signal 115 which is configured to steer a beam of the ESA 104 in either the X direction or the Y direction.

In embodiments, the phase shift network 102 and/or the communication system 100 may include one or more additional signal processing components 120. It is noted herein that the relative location of the one or more additional signal processing components 120 is provided solely for example, and should not be regarded as limiting. In this regard, the communication system 100 and/or the phase shift network 102 may include one or more additional signal processing components distributed throughout the communication system 100 and/or the phase shift network 102. The one or more additional signal processing components 120 may include, but are not limited to, filters (e.g., band pass filters), amplifiers, and the like.

In embodiments, the phase shift/phase distribution generated by the PSN output signal 115, which is configured to steer a beam of the ESA 104, may be selectively adjusted, modified, or tuned by selectively modifying a frequency of the tuning signals 107*a*, 107*b*, 111 generated by the tunable LO 106*a*, 106*b*, 112, respectively. In this regard, the phase shift network 102 may be configured to selectively steer a beam of the ESA 104 by selectively modifying a frequency of a tuning signal 107*a*, 107*b*, 111 generated by the respective tunable LO 106*a*, 106*b*, 112.

For example, modifying the tuning signal 107*a* generated by the tunable LO 106*a* may modify/adjust one or more characteristics (e.g., frequency) of the intermediate phase shift signal 109*a*, and therefore one or more characteristics of the PSA output signal 115. In this regard, by modifying one or more characteristics of the PSA output signal 115, the modification of the tuning signal 107*a* effectively modifies the phase shift/phase distribution provided to the plurality of antenna terminal elements 105, and thereby modifies a pointing angle of a beam received and/or transmitted by the ESA 104.

Figure 3:
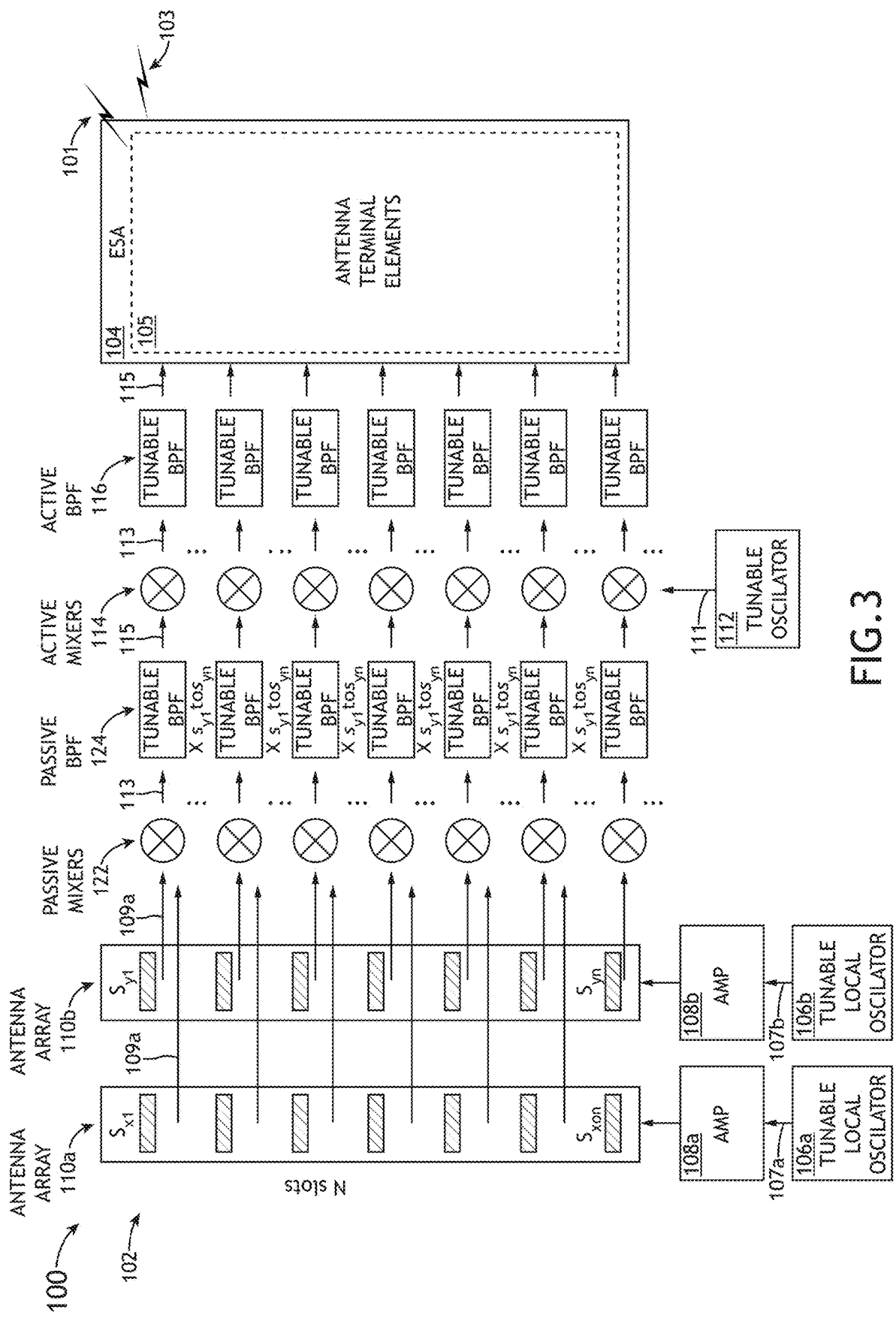
FIG. 3 illustrates a communication system including a phase shift network, in accordance with one or more embodiments of the present disclosure.

FIG. 3 illustrates a communication system 100 including a phase shift network 102, in accordance with one or more embodiments of the present disclosure. The communication system 100 may include, but is not limited to, a phase shift network 102 and an electronically scanned array (ESA 104) including a plurality of antenna terminal elements 105. It is noted herein that any discussion regarding the communication system 100 and phase shift network 102 depicted in FIGS. 1-2 may be regarded as applying to the communication system 100 and phase shift network 102 depicted in FIGS. 3-4, unless noted otherwise herein. Conversely, it is noted herein that any discussion regarding the communication system 100 and phase shift network 102 depicted in FIGS. 3-4 may be regarded as applying to the communication system 100 and phase shift network 102 depicted in FIGS. 1-2, unless noted otherwise herein.

In embodiments, the phase shift network 102 illustrated in FIG. 3 may be configured to generate phase distributions in order to point/steer output beam 101 and/or input beam 103 of the ESA 104 in two directions (e.g., X direction and Y direction) simultaneously. Accordingly, as compared to the phase shift network 102 depicted in FIGS. 1-2, which is configured to steer a beam of the ESA 104 in a single direction, the phase shift network 102 depicted in FIGS. 3-4, may be configured to steer a beam of the ESA 104 in two separate directions.

In embodiments, the phase shift network 102 illustrated in FIG. 3 may include one or more passive mixers 122 and one or more passive band pass filters 124. The one or more passive mixers 122 may be configured to receive the intermediate phase shift signal 109*a* from the first antenna array 110*a* and/or the intermediate phase shift signal 109*b* from the second antenna array 110*b* to generate a combined intermediate phase shift signal 117. In this regard, the one or more passive mixers 122 may be configured to combine the outputs of each respective antenna array 110*a*, 110*b* to generate an intermediate phase shift signal 117 which includes phase shifts in both the X direction and the Y direction. In embodiments, the combined intermediate phase shift signal 117 may be passed through one or more passive band pass filters 124 and to the various active mixers 114, active band pass filters 116, and ESA 104, as described previously herein.

Accordingly, the one or more passive mixers 122 may be configured to combine outputs of the first antenna array 110*a* and the second antenna array 110*b* such that the PSA output signal 115 provided to the ESA 104 generates a phase shift configured to steer a beam of the ESA 104 in both the X direction and the Y direction. The phase shift network 102 illustrated in FIG. 3 may be further shown and described with reference to FIG. 4.

Figure 4:
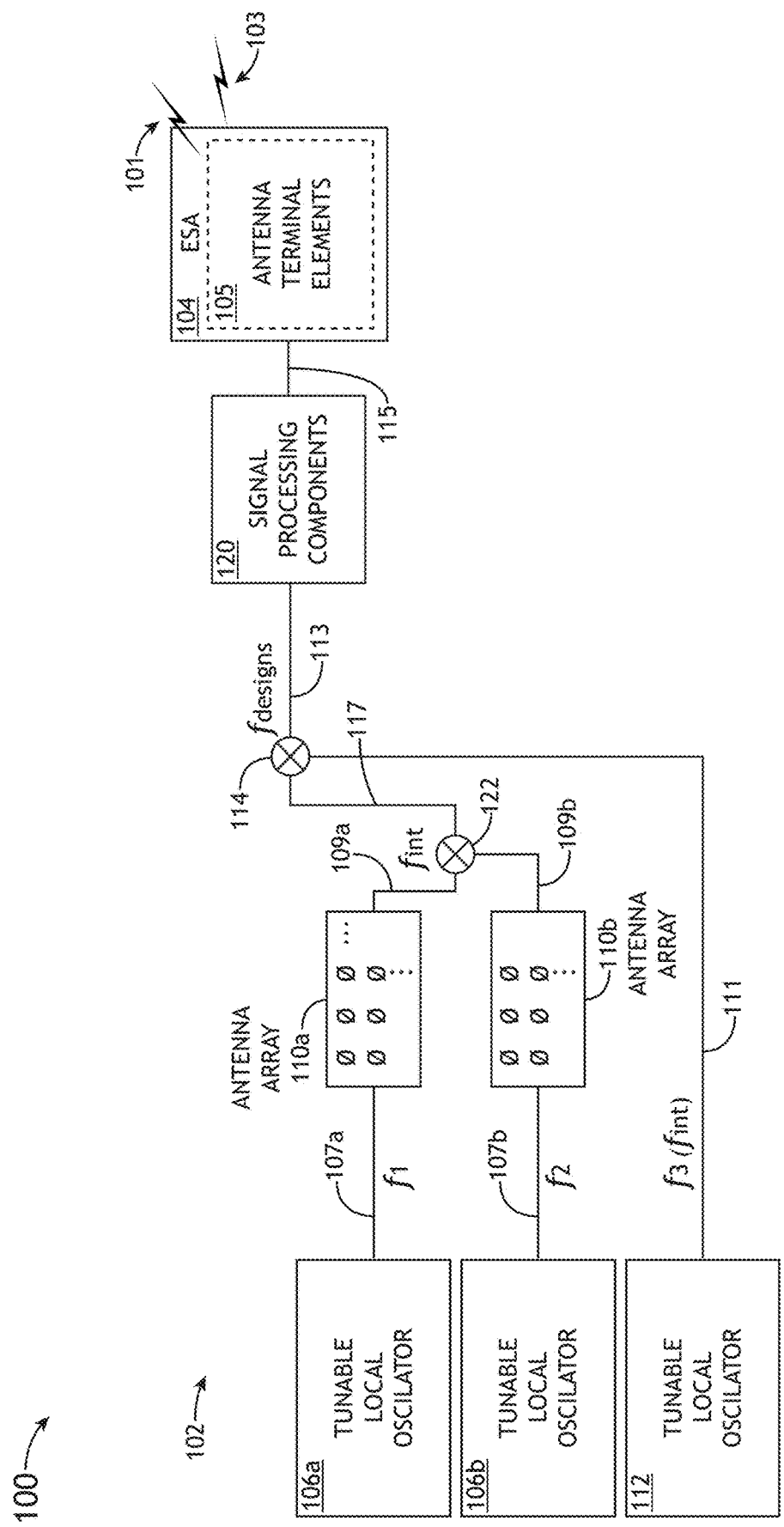
FIG. 4 illustrates a communication system including a phase shift network, in accordance with one or more embodiments of the present disclosure.

FIG. 4 illustrates a communication system 100 including a phase shift network 102, in accordance with one or more embodiments of the present disclosure. More particularly, FIG. 4 illustrates an additional and/or alternative conceptual view of the phase shift network 102 depicted in FIG. 3 which is configured to generate phase shifts in order to steer a beam of the ESA 104 in both the X direction and the Y direction.

In embodiments, the first tunable LO 106*a* and the second tunable LO 106*b* are configured to generate tuning signals 107*a*, 107*b*, wherein the first antenna array 110*a* and the second antenna array 110b are configured to generate intermediate phase shift signals 109a, 109b in response to the tuning signals 107a, 107b. The first intermediate phase shift signal 109a and the second intermediate phase shift signal 109b may be combined by one or more passive mixers 122 to generate a combined intermediate phase shift signal 117. In embodiments, the combined intermediate phase shift signal 117 may be combined with a tuning signal 111 from the tunable LO 112 in order to generate a PSN output signal 115. The PSN output signal 115 may then be transmitted to the plurality of antenna terminal elements 105 of the ESA 104 in order to adjust one or more characteristics of an output beam 101 transmitted by the ESA 104 or an input beam 103 received by the ESA 104. For example, the PSN output signal 115 may be configured to steer a beam (e.g., output beam 101, input beam 103) in both the X direction and the Y direction (e.g., X direction phase shifts, Y direction phase shifts).

Figure 5A:
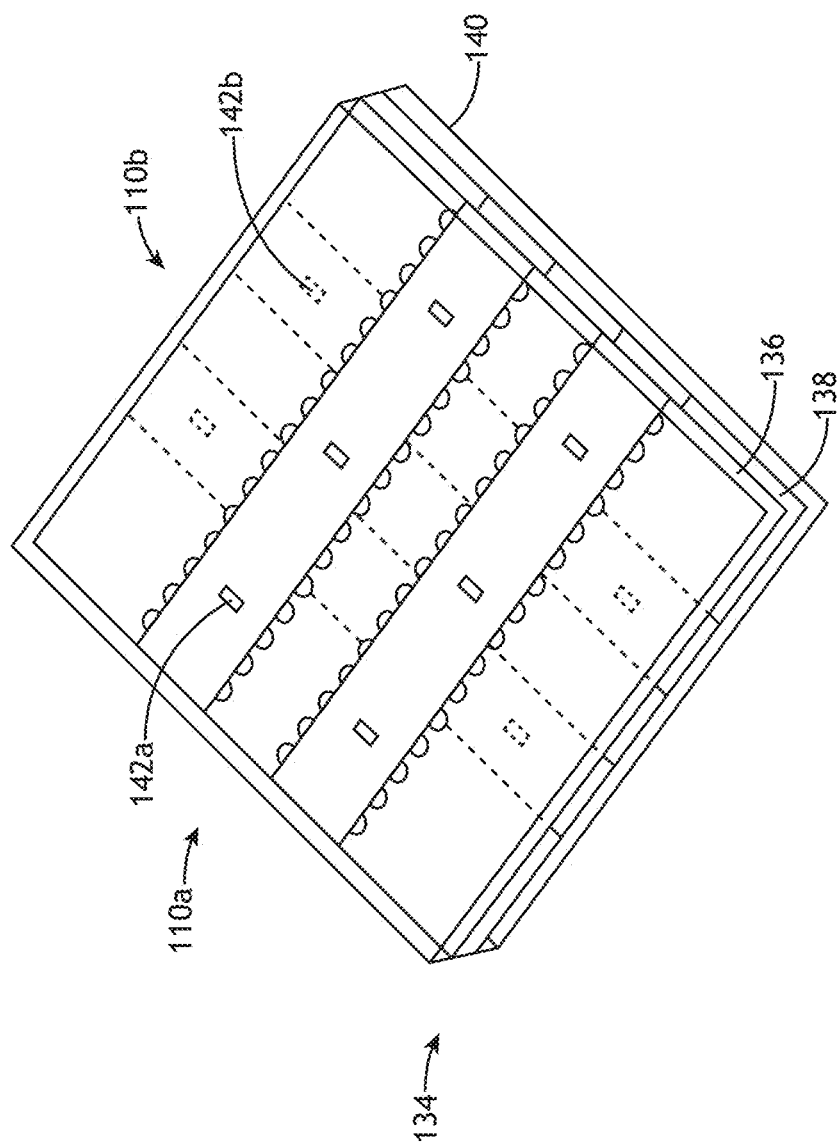
FIG. 5A illustrates sets of antenna arrays of a phase shift network disposed in a stacked substrate die, in accordance with one or more embodiments of the present disclosure.

FIG. 5A illustrates sets of antenna arrays 110a, 110b of a phase shift network 102 disposed in a stacked substrate die 134, in accordance with one or more embodiments of the present disclosure. More particularly, FIG. 5A illustrates an example implementation of the phase shift network 102 including slotted leaky wave antenna arrays 110a, 110b disposed in various layers of a stacked substrate die 134. It is noted herein that the slotted leaky wave antenna arrays 110a, 110b illustrated in FIG. 5A do not illustrate the ESA 104, antenna terminal elements 105, and/or PSN output signals 115 transmitted from the slotted leaky wave antenna arrays 110a, 110b to the ESA 104.

In embodiments, the various antenna arrays 110a, 110b may be disposed in different layers of a stacked substrate die 134. For example, as shown in FIG. 5A, the first antenna array 110a configured to steer a beam in the X direction may be disposed in a first layer 136 of the stacked substrate die 134. By way of another example, the second antenna array 110b configured to steer a beam in the Y direction may be disposed in a second layer 138 of the stacked substrate die 134. In embodiments, the stacked substrate die 134 may further include one or more ground layers 140 which are configured to reduce emissions and provide isolation from leaky wave radiation.

As noted previously herein, the antenna arrays 110a, 110b may include any antenna arrays known in the art including, but not limited to, slotted leaky wave antennas. For example, as shown in FIG. 5A, the antenna arrays 110a, 110b may include slotted leaky wave antennas 110a, 110b, wherein each of the first leaky wave antenna array 110a and the second leaky wave antenna array 110b include one or more slots 142a-142n. The slotted leaky wave antennas 110a, 110b may include bottom conductor layers and top conductive layers including the one or more slots 142a-142b, wherein the bottom conductor layers and the top conductor layers are separated via a dielectric material. It is contemplated herein that leaky wave antenna arrays 110a, 110b may be designed with varying number of slots 142 in order to most effectively and efficiently provide per-element phase shifts to each antenna array terminal element 105 of a particular ESA 104.

Figure 5B:
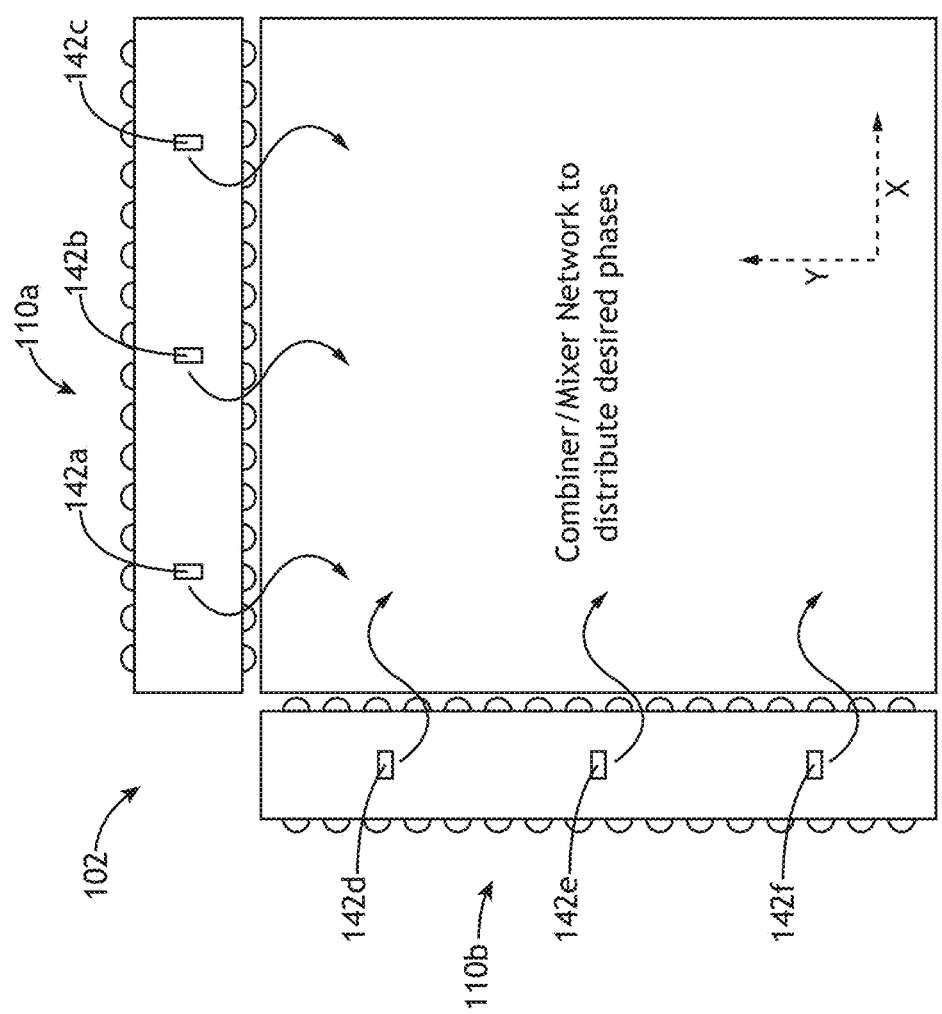
FIG. 5B illustrates a top view of a phase shift network including sets of antenna arrays, in accordance with one or more embodiments of the present disclosure.
Figure 5C:
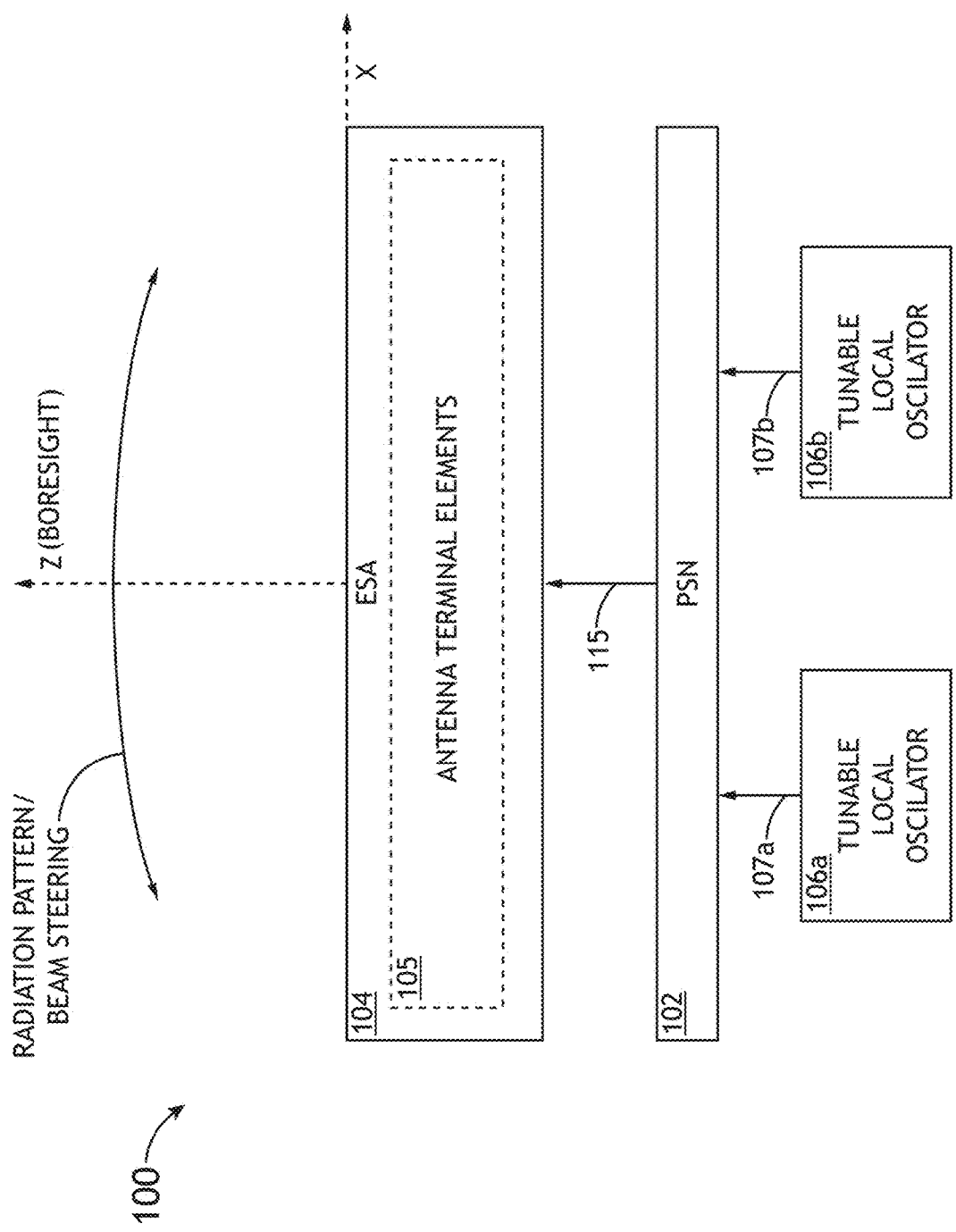
FIG. 5C illustrates a cross sectional view of top view of a communication system including a phase shift network and an electronically scanned array (ESA), in accordance with one or more embodiments of the present disclosure.

FIG. 5B illustrates a top view of a phase shift network 102 including sets of antenna arrays 110a, 110b, in accordance with one or more embodiments of the present disclosure. FIG. 5C illustrates a cross-sectional view of a communication system 100 including the phase shift network 102 and an electronically scanned array (ESA 104), in accordance with one or more embodiments of the present disclosure.

In additional and/or alternative embodiments, multiple antenna arrays 110a, 110b may be disposed proximate to one another. For example, the first leaky wave antenna array 110a configured to steer a beam in the X direction and the second antenna array 110b configured to steer a beam in the Y direction may be disposed in the same plane. It is noted herein that the phase shift network 102 may implement phase-length-matched distribution splitter and combiner paths at various stages of mixing in order to maintain desired phase as signals are passed throughout the layers of the phase shift network 102.

As shown in FIG. 5C, the communication system 100 may include one or more tunable local oscillators 106a, 106b disposed beneath the phase shift network 102. The phase shift network 102 may further be disposed beneath the ESA 104 and antenna terminal elements 105. In this regard, the phase shift network 102 may be configured to generate PSN output signals 115 (e.g., phase shifted signals) which may be provided to each antenna terminal element 105 of the plurality of antenna terminal elements 105 of the ESA 104 in order to steer a beam (e.g. output beam 101) of the ESA 104 along an X direction and/or Y direction relative to boresight.

Figure 6A:
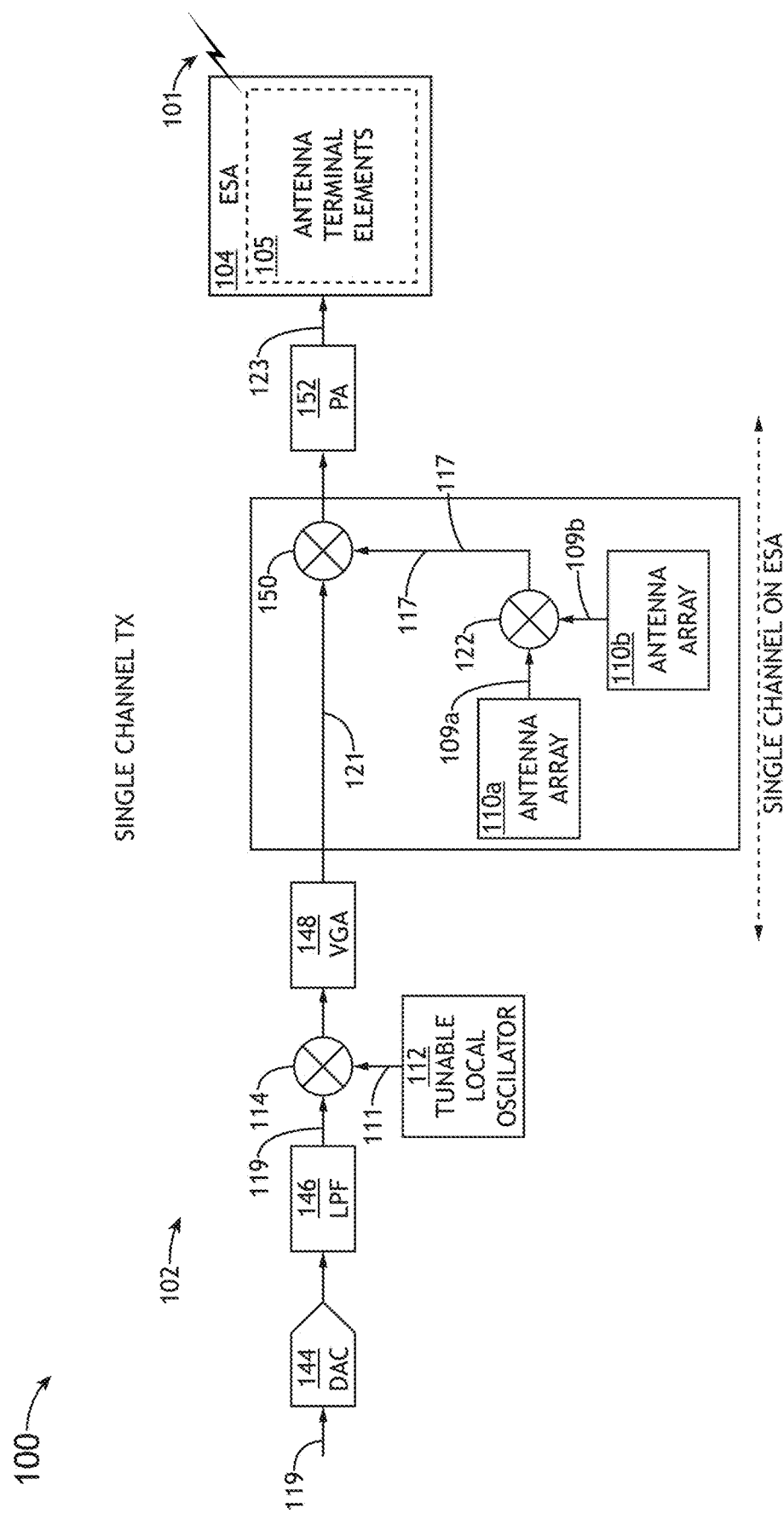
FIG. 6A illustrates single transmit channel of a communication system including a phase shift network, in accordance with one or more embodiments of the present disclosure.

FIG. 6A illustrates single transmit channel of a communication system including a phase shift network for transmitting a beam of signals, in accordance with one or more embodiments of the present disclosure. It is noted herein that any discussion regarding the communication system 100 and phase shift network 102 depicted in FIGS. 1-5B may be regarded as applying to the communication system 100 and phase shift network 102 depicted in FIG. 6A, unless noted otherwise herein. Conversely, it is noted herein that any discussion regarding the communication system 100 and phase shift network 102 depicted in FIG. 6A may be regarded as applying to the communication system 100 and phase shift network 102 depicted in FIGS. 1-5B, unless noted otherwise herein.

FIG. 6A illustrates and additional and/or alternative conceptual view of the communication system 100 described herein. In particular, FIG. 6A illustrates a phase shift network 102 of a communication system 100 which is configured to generate phase shifts/phase distributions in order to steer an output beam 103 transmitted by a plurality of antenna terminal elements 105 of an ESA 104. In this regard, the communication system 100 shown in FIG. 6A illustrates a single transmit channel of an ESA 104 within a communication system 100.

In embodiments, one or more additional components of the communication system 100 may generate an initial transmit signal 119. The initial transmit signal 119 may include an initial signal which is to be processed by the communication system 100 in order to cause the ESA 104 to transmit an output beam 101. The initial transmit signal 119 may include a digital input transmit signal 119 which is converted to an analog initial transmit signal by a digital-to-analog converter (DAC 144). The analog initial transmit signal 119 may then be passed through a low-pass filter (LPF 146) and input into one or more active mixers 114. In embodiments, the one or more active mixers 114 may be configured to combine the initial transmit signal 119 and the tuning signal 111 generated by one or more tunable LO 112 in order to generate an intermediate transmit signal 121.

The intermediate transmit signal 121 may be passed through a variable gain amplifier (VGA 148) and input into one or more mixers 150. As noted previously herein, a first antenna array 109a configured to generate phase shifts in the X direction and a second antenna array 109b configured to generate phase shifts in the Y direction may generate intermediate phase shift signals 109a, 109b which are combined by one or more passive mixers 122 into a combined intermediate phase shift signal 117. In embodiments, the combined intermediate phase shift signal 117 and the intermediate transmit signal 121 are combined by the one or more mixers 150 to generate ESA input signals 123.

It is noted herein that where phase shifts are only to be generated in one direction (e.g., X direction or Y direction), the combined intermediate phase shift signal 117 may include either the first intermediate phase shift signal 109 or the second intermediate phase shift signal 109b. For instance, where a phase shift is to be generated in either the X direction or the Y direction, one or more switches may be included within communication system 100 in addition to, or in lieu of, the passive mixers 122. In this regard, it may be said that the one or more mixers 150 are configured to combine the intermediate transmit signal 121 and at least one of the first intermediate phase shift signal 109 or the second intermediate phase shift signal 109.

In embodiments, the ESA input signals 123 may be passed through a power amplifier (PA 152) and transmitted to the ESA 104. In further embodiments, the ESA input signals 123 may be configured to cause the plurality of antenna terminal elements 105 of the ESA 104 to transmit an output beam 101. In this regard, the ESA input signals 123 may include a phase shift/phase distribution which is configured to steer the output beam 101 generated by the ESA 104. For example, the combined intermediate phase shift signal 117 may be configured to induce a phase shift in the ESA input signals 123, wherein the phase shift includes a phase shift in X direction and a phase shift in the Y direction.

It is noted herein that the phase shifts of the ESA input signals 123 generated by the phase shift network 102, and therefore the steering of the output beam 101, may be a result of the frequencies of the tuning signals 107a, 107b (not shown) fed to the antenna arrays 110a, 110b, and the frequency of the tuning signal 111 generated by the tunable LO 112. In this regard, the phase shifts of the ESA input signals 123 (and therefore the steering of the output beam 101) may be selectively modified by selectively modifying a frequency of one or more of the tuning signals 107a, 107b, 111. For example, selectively modifying at least one frequency of the tuning signal 107a, tuning signal 107b, or tuning signal 111 may be configured to selectively adjust a phase shift of the ESA input signals 123, thereby steering the output beam 101 transmitted by the ESA 104.

As noted previously herein, the communication system 100 may include one or more additional signal processing components 120 (e.g., filters, amplifiers, and the like). In this regard, the communication system 100 and/or the phase shift network 102 may include one or more additional signal processing components distributed throughout the communication system 100 and/or the phase shift network 102. For example, the communication system 100 depicted in FIG. 6A may include one or more tunable filters disposed along the path of the combined intermediate phase shift signal 117, along the path of the ESA input signals 123, along the path of the intermediate transmit signal 121, and the like.

Figure 6B:
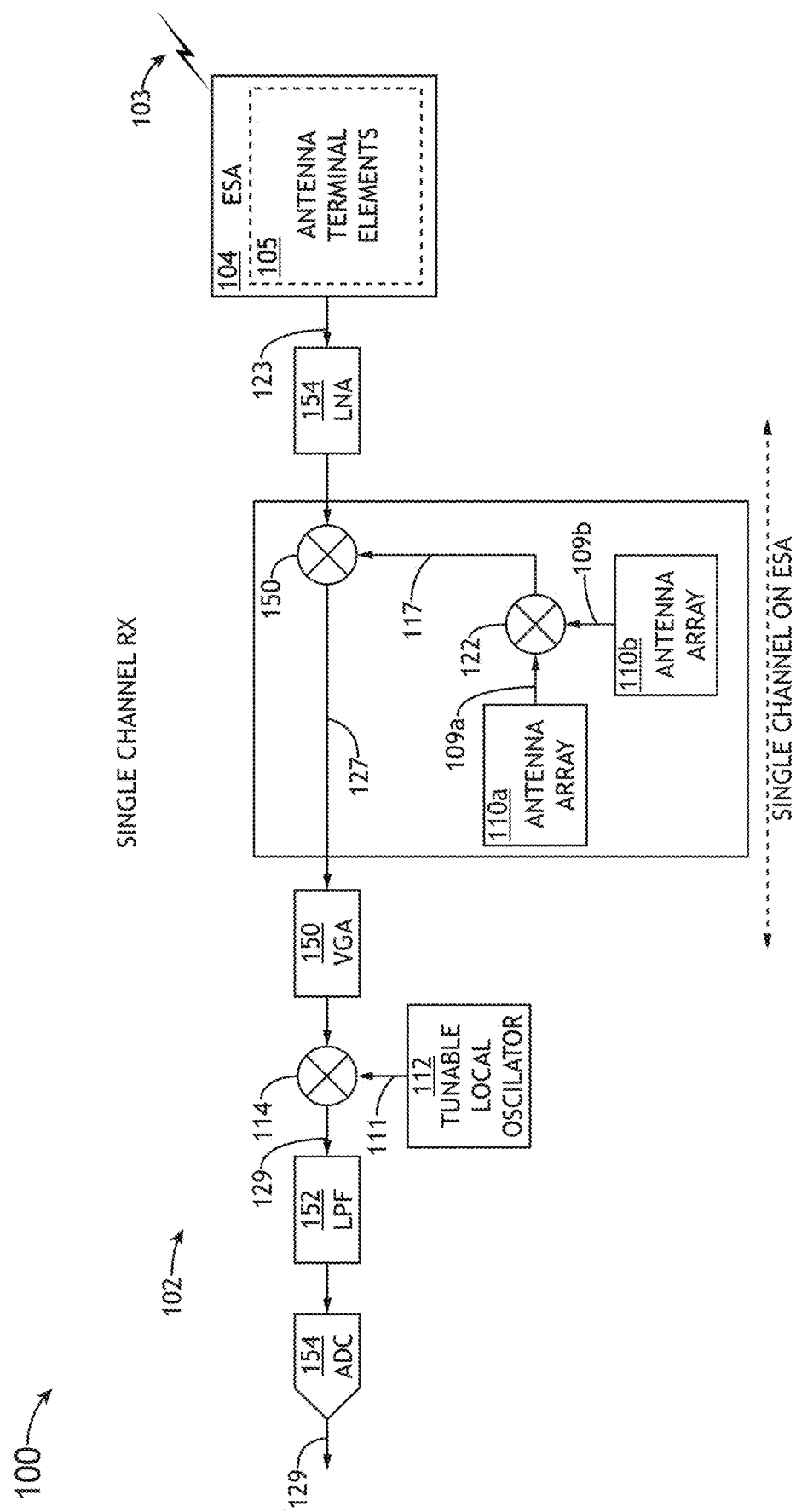
FIG. 6B illustrates single receive channel of a communication system including a phase shift network, in accordance with one or more embodiments of the present disclosure.

FIG. 6B illustrates single receive channel of a communication system 100 including a phase shift network 102, in accordance with one or more embodiments of the present disclosure. It is noted herein that any discussion regarding the communication system 100 and phase shift network 102 depicted in FIGS. 1-6A may be regarded as applying to the communication system 100 and phase shift network 102 depicted in FIG. 6B, unless noted otherwise herein. Conversely, it is noted herein that any discussion regarding the communication system 100 and phase shift network 102 depicted in FIG. 6B may be regarded as applying to the communication system 100 and phase shift network 102 depicted in FIGS. 1-6A, unless noted otherwise herein.

FIG. 6B illustrates and additional and/or alternative conceptual view of the communication system 100 described herein. In particular, FIG. 6B illustrates a phase shift network 102 of a communication system 100 which is configured to generate phase shifts/phase distributions in order to steer an input beam 103 received by a plurality of antenna terminal elements 105 of an ESA 104. In this regard, the communication system 100 shown in FIG. 6B illustrates a single receive channel of an ESA 104 within a communication system 100.

In embodiments, the plurality of antenna terminal elements 105 of an ESA 104 may receive an input beam 103. The plurality of antenna terminal elements 105 may be configured to combine the received signals from the input beam 103 to generate ESA output signals 125. As noted previously herein, a first antenna array 109a configured to generate phase shifts in the X direction and a second antenna array 109b configured to generate phase shifts in the Y direction may generate intermediate phase shift signals 109a, 109b which are combined by one or more passive mixers 122 into a combined intermediate phase shift signal 117. In embodiments, the combined intermediate phase shift signal 117 and the ESA output signals 125 are combined by the one or more mixers 150 to generate an intermediate receive signal 127.

In embodiments, the intermediate receive signal 127 may be passed through a variable gain amplifier (VGA 148) and input into one or more active mixers 114. In embodiments, the one or more active mixers 114 may be configure to combine the intermediate receive signal 127 and the tuning signal 111 generated by one or more tunable LO 112 in order to generate a final receive signal 129. The final receive signal 129 may be passed through one or more low-pass filters 152. The final receive signal 129 may then be converted from an analog signal to a digital signal by an analog-to-digital converter (ADC 154). In embodiments, the final receive signal 129 may be transmitted to one or more additional components of the communication system 100 for signal processing. In this regard, the final receive signal 129 may be regarded as the output of the phase shift network 102 within the communication system 100 in response to the input beam 103.

It is noted herein that the phase shifts of the final receive signal 129 generated by the phase shift network 102, and therefore the steering of the input beam 103, may be a result of the frequencies of the tuning signals 107a, 107b (not shown) fed to the antenna arrays 110a, 110b, and the frequency of the tuning signal 111 generated by the tunable LO 112. In this regard, the phase shifts of the final receive signal 129 (and therefore the steering of the input beam 103) may be selectively modified by selectively modifying a frequency of one or more of the tuning signals 107a, 107b, 111. For example, selectively modifying at least one frequency of the tuning signal 107a, tuning signal 107b, or tuning signal 111 may be configured to selectively adjust a phase shift of the final receive signal 129, thereby steering the input beam 103 received by the ESA 104.

As noted previously herein, the communication system 100 may include one or more additional signal processing components 120 (e.g., filters, amplifiers, and the like). In this regard, the communication system 100 and/or the phase shift network 102 may include one or more additional signal processing components distributed throughout the communication system 100 and/or the phase shift network 102. For example, the communication system 100 depicted in FIG. 6B may include one or more tunable filters disposed along the path of the combined intermediate phase shift signal 117, along the path of the ESA output signals 125, along the path of the intermediate receive signal 127, and the like.

Figure 7A:
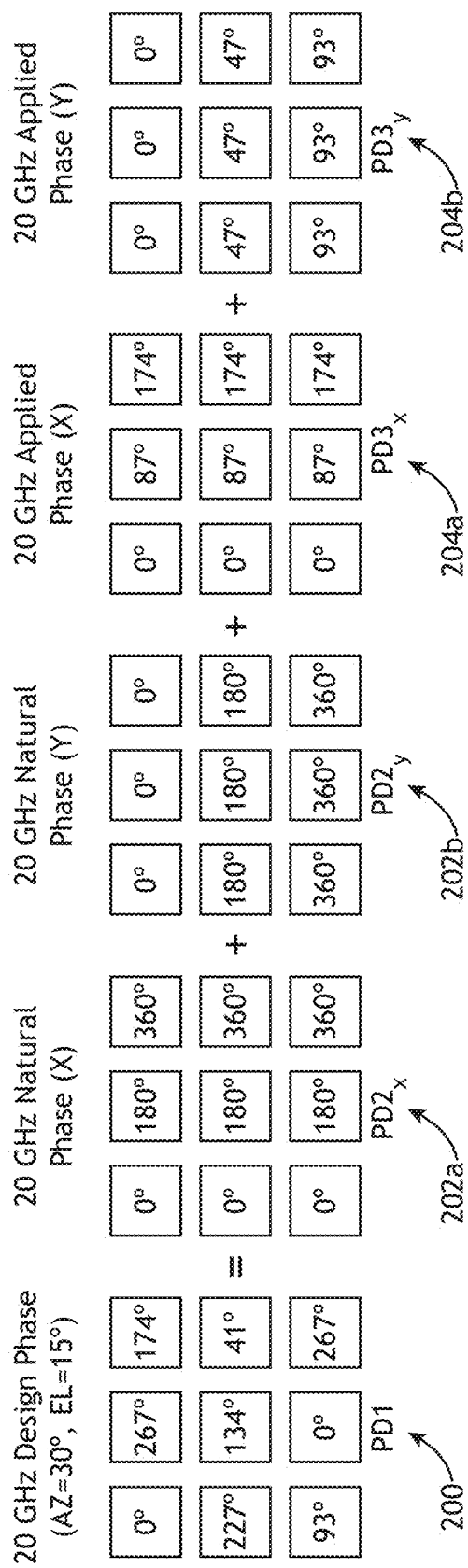
FIG. 7A illustrates a beam pointed phase distribution of a 20 GHz electronically scanned array, in accordance with one or more embodiments of the present disclosure.

FIG. 7A illustrates a beam pointed phase distribution of a 20 GHz electronically scanned array, in accordance with one or more embodiments of the present disclosure.

It is noted herein that embodiments of the present disclosure may enable antenna arrays 110*a*, 110*b* operating at one or more frequencies to generate phase shifts configured to steer beams received/transmitted by the ESA 104 operating at a different frequency from that of the antenna arrays 110*a*, 110*b*. For example, the ESA 104 may be configured to operate at a first frequency, the antenna array 110*a* may be configured to operate at a second frequency, and the antenna array 110*b* may be configured to operate at a third frequency, wherein the first frequency is less than the second and third frequencies. By way of another example, the ESA 104 may be configured to operate at a first frequency, and the antenna arrays 110*a*, 110*b* may be configured to operate at a second frequency, wherein the first frequency is greater than the second frequency. For instance, an ESA 104 of communication system 100 may be configured to transmit an output beam 103 at a frequency of 20 GHz. In this example, a phase shift network 102 including a first antenna array 110*a* and a second antenna array 110*b* may be configured to generate intermediate phase shift signals 109*a*, 109*b* at a frequency of 5 GHz which may be used by the phase shift network 102 to generate phase shifts within the ESA input signals 123 and steer the output beam 101, despite the difference in operating frequencies.

For instance, a 20 GHz design phase distribution 200 in FIG. 7A (e.g., Phase Distribution 1 (PD1)) illustrates a design phase for an ESA 104 with antenna terminal elements 105 arranged in a 3×3 array operating at 20 GHz. The 20 GHz design phase distribution 200 (PD1) may be the sum of a 20 GHz natural phase distribution 202*a* ($PD2_x$), a 20 GHz natural phase distribution 202*b* ($PD2_y$), a 20 GHz applied phase distribution 204*a* ($PD3_x$), and a 20 GHz applied phase distribution 204*b* ($PD3_y$). In this regard, $PD1=PD2_x+PD2_y+PD3_x+PD3_y$. In this example, the 20 GHz ESA 104 may be included within a communication system with a phase distribution network 102 including antenna arrays 110*a*, 110*b* operating at 5 GHz. In this regard, it must be determined what 5 GHz applied phase distributions are required to achieve the desired 20 GHz design phase distribution 200 (PD1). This may be further understood with reference to FIG. 7B.

Figure 7B:
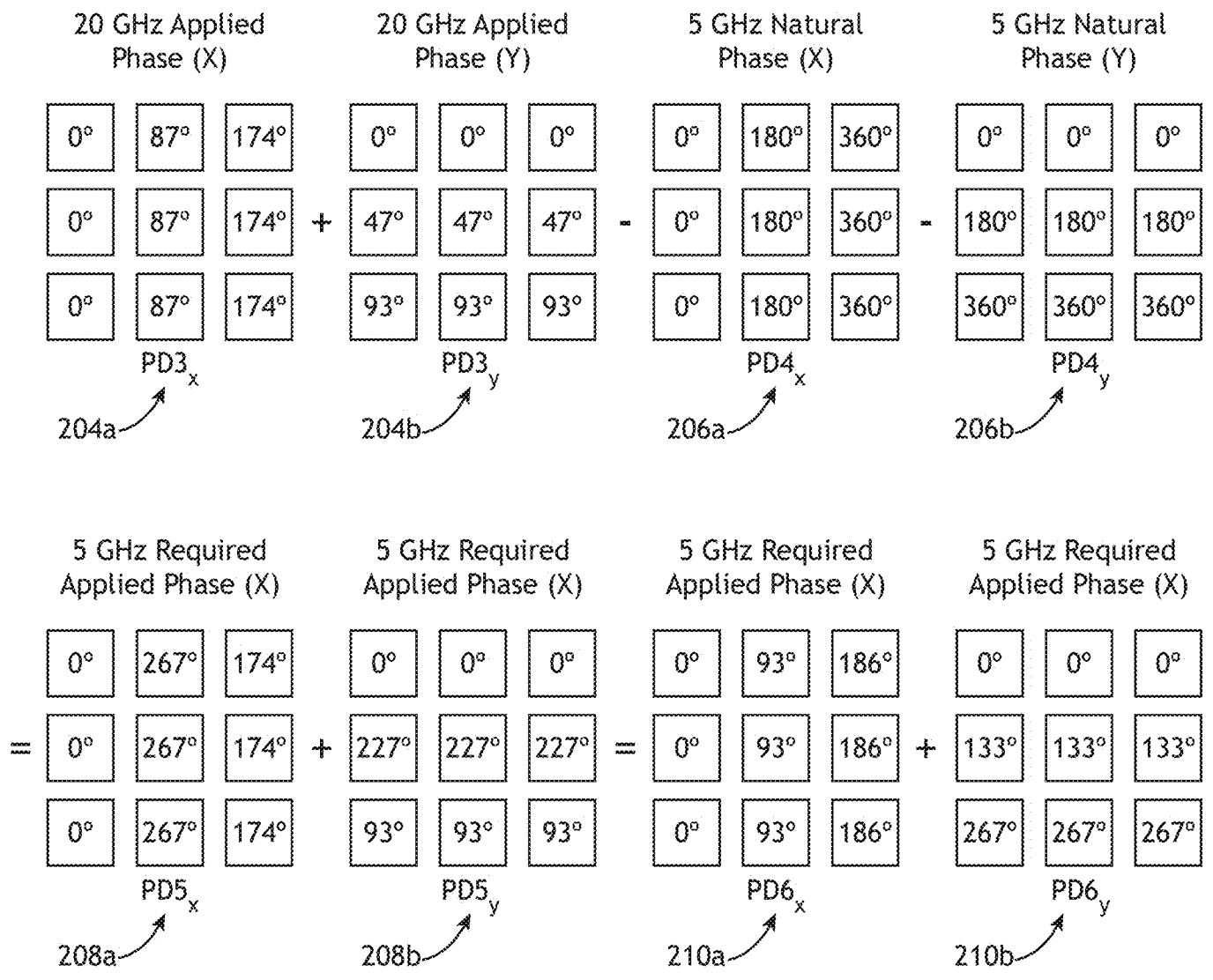

FIG. 7B illustrates a required applied phase shifts of 5 GHz antenna arrays to generate a beam pointed phase distribution of a 20 GHz electronically scanned array, in accordance with one or more embodiments of the present disclosure.

The 20 GHz applied phase distribution 204*a* ($PD3_x$) and the 20 GHz applied phase distribution 204*a* ($PD3_y$) illustrated in the upper left hand corner of FIG. 7B have been brought over from FIG. 7A. Continuing with the same example, subtracting a 5 GHz natural phase distribution 206*a* ($PD4_x$) and a 5 GHz required applied phase distribution 208*a* ($PD3_y$) from the 20 GHz natural phase distribution 204*a* ($PD3_y$) and the 20 GHz required applied phase distribution 204*b* ($PD3_y$) to yield a 5 GHz required applied phase distribution 208*a* ($PD5_x$) and a 5 GHz required applied phase distribution 208*b* ($PD5_y$) (e.g., $PD3_x-PD4_x=PD5_x$ and $PD3_y-PD4_y=PD5_y$).

Accordingly, it may be seen that the 20 GHz design phase distribution 200 (PD1) may be achieved by the antenna arrays 110*a*, 110*b* operating at 5 GHz by generating the 5 GHz required applied phase distribution 208*a* ($PD5_x$) and the 5 GHz required applied phase distribution 208*b* ($PD5_y$). Furthermore, simplifying the 5 GHz required applied phase distribution 208*a* ($PD5_x$) and the 5 GHz required applied phase distribution 208*b* ($PD5_y$) yields a 5 GHz required applied phase distribution 210*a* ($PD6_x$) and a 5 GHz required applied phase distribution 210*b* ($PD6_y$) (e.g., $PD5_x=PD6_x$ and $PD5_y=PD6_y$).

Accordingly, it may be appreciated herein that a design phase distribution for a beam received and/or transmitted (e.g., output beam 101, input beam 103) by an ESA 104 may be steered by phase shifts and phase distributions generated by antenna arrays 110*a*, 110*b* operating at a frequency which is different from the operational frequency of the ESA 104. In this regard, it is contemplated herein that the operational frequency and/or the output of the phase shift network 102 need not be the same frequency as the operational frequency of the ESA 104 in order to effectively and efficiently steer beams transmitted and/or received by the ESA 104.

Although example embodiments of the present disclosure are shown and described in an aircraft environment, the inventive concepts of the present disclosure may be configured to operate in alternative and/or additional contexts, unless noted otherwise herein. For example, the embodiments of the present disclosure may be incorporated into the any air, land, or water-based vehicle (e.g., aircraft, automobiles, boats, ships, military vehicles). Thus, references to "aircraft," "airplanes," "avionics," and like terms should not be interpreted as a limitation on the present disclosure, unless noted otherwise herein.

It is further noted herein that, where the environment includes an aircraft environment, it is noted herein the embodiments of communication system 100 may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims.

Furthermore, any dimensions, degrees, and/or numerical ranges provided herein are to be understood as non-limiting examples unless otherwise specified in the claims.

What is claimed:

1. A communication system, comprising:
an electronically scanned array (ESA) including a plurality of antenna terminal elements, wherein the electronically scanned array is configured to transmit an output beam; and
a phase shift network configured to steer the output beam, the phase shift network comprising:
a first set of one or more tunable local oscillators;
a first antenna array configured to receive a tuning signal from the first set of one or more tunable local oscillators to generate a first intermediate phase shift signal;
a second antenna array configured to receive a signal from the first set of one or more tunable local oscillators to generate a second intermediate phase shift signal; and
a first plurality of mixers configured to combine an intermediate transmit signal and at least one of the first intermediate phase shift signal or the second intermediate phase shift signal to generate ESA input signals, wherein the ESA is configured generate the output beam in response to the ESA input signals;
wherein the first intermediate phase shift signal induces a phase shift of the ESA input signals in a first direction, and the second intermediate phase shift signal induces a phase shift of the ESA input signals in a second direction different from the first direction.

2. The system of claim 1, wherein the first set of one or more tunable local oscillators are configured to:
adjust a frequency of the tuning signal in order to adjust a frequency of the first intermediate phase shift signal or the second intermediate phase shift signal in order to adjust a phase shift of the intermediate transmit signal.

3. The system of claim 1, wherein the second direction different from the first direction comprises a second direction orthogonal to the first direction.

4. The system of claim 1, wherein at least one of the first antenna array or the second antenna array comprises a leaky wave antenna array.

5. The system of claim 4, wherein the leaky wave antenna array comprises an array of slotted leaky wave antennas.

6. The system of claim 4, wherein the first antenna array comprises a first leaky wave antenna array disposed in a first layer of a stacked substrate device, and wherein the second antenna array comprises a second leaky wave antenna array disposed in a second layer of the stacked substrate die different from the first layer.

7. The system of claim 1, wherein the first set of one or more tunable local oscillators comprises:
a first local oscillator coupled to the first antenna array; and
a second local oscillator coupled to the second antenna array.

8. The system of claim 1, further comprising:
a second plurality of mixers configured to combine the first intermediate phase shift signal and the second intermediate phase shift signal to generate a combined intermediate phase shift signal.

9. The system of claim 8, wherein the first plurality of mixers are configured to:
combine the intermediate transmit signal and the combined intermediate phase shift signal to generate the ESA input signals; and
transmit the ESA input signals to the electronically scanned array.

10. The system of claim 9, wherein the combined intermediate phase shift signal is configured to induce a phase shift in the ESA input signals, wherein the phase shift includes a phase shift in the first direction and a phase shift in the second direction.

11. The system of claim 8, further comprising:
a second set of one or more tunable local oscillators configured to generate a second tuning signal; and
a third plurality of mixers configured to combine an initial transmit signal and the second tuning signal generated by the second set of one or more tunable oscillators to generate the intermediate transmit signal.

12. The system of claim 11, wherein the first set of one or more tunable oscillators and the second set of one or more tunable oscillators are configured to selectively adjust a frequency of the tuning signal generated by the first set of one or more tunable oscillators and the tuning signal generated by the second set of one or more tunable oscillators in order to selectively adjust a phase shift of the ESA input signals.

13. The system of claim 1, wherein the electronically scanned array is configured to transmit the output beam at a first frequency, and wherein at least one of the first intermediate phase shift signal or the second intermediate phase shift signal includes a signal with a second frequency different from the first frequency.

14. The system of claim 13, wherein the first frequency is greater than the second frequency.

15. A communication system, comprising:
an electronically scanned array (ESA) including a plurality of antenna terminal elements, wherein the electronically scanned array is configured to receive an input beam and generate ESA output signals in response to the received input beam; and
a phase shift network, the phase shift network comprising:
a first set of one or more tunable local oscillators;
a first antenna array configured to receive a tuning signal from the first set of one or more tunable local oscillators to generate a first intermediate phase shift signal;
a second antenna array configured to receive a signal from the first set of one or more tunable local oscillators to generate a second intermediate phase shift signal; and
a first plurality of mixers configured to combine the ESA output signals and at least one of the first intermediate phase shift signal or the second intermediate phase shift signal to generate an intermediate receive signal,
wherein the first intermediate phase shift signal induces a phase shift of the ESA output signals in a first direction, and the second intermediate phase shift signal induces a phase shift of the ESA output signals in a second direction different from the first direction.

* * * * *